H. GRAD, S. H. KLEEBERG & W. HARRIS.
ADVERTISING DISPLAY DEVICE.
APPLICATION FILED JAN. 30, 1913.

1,107,293.

Patented Aug. 18, 1914.
3 SHEETS—SHEET 2.

WITNESSES:
Howard R. King.
Mildred E. Brooks

INVENTORS:
Hyman Grad,
Sydney H. Kleeberg
and William Harris,
BY
Russell M. Everett,
ATTORNEY.

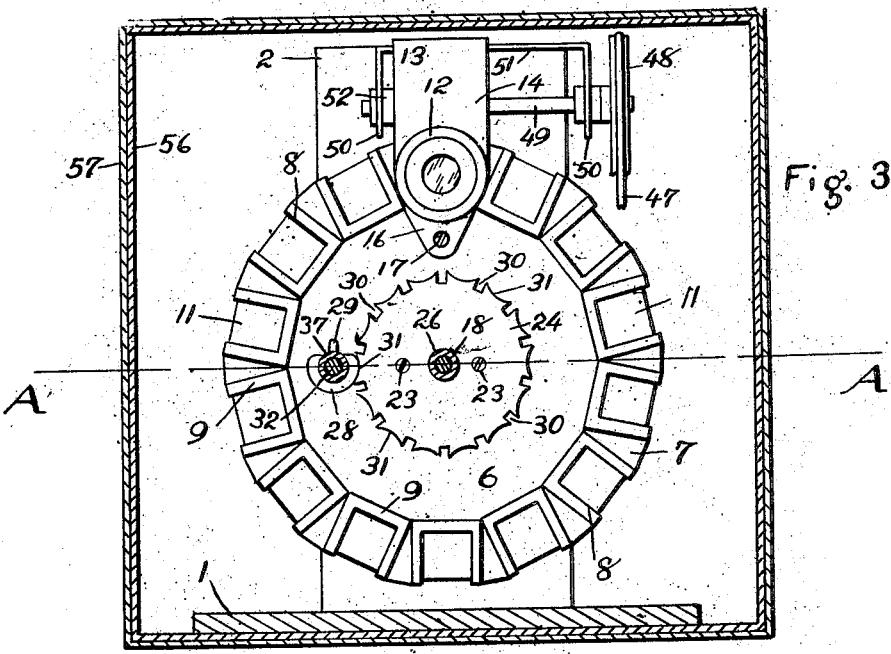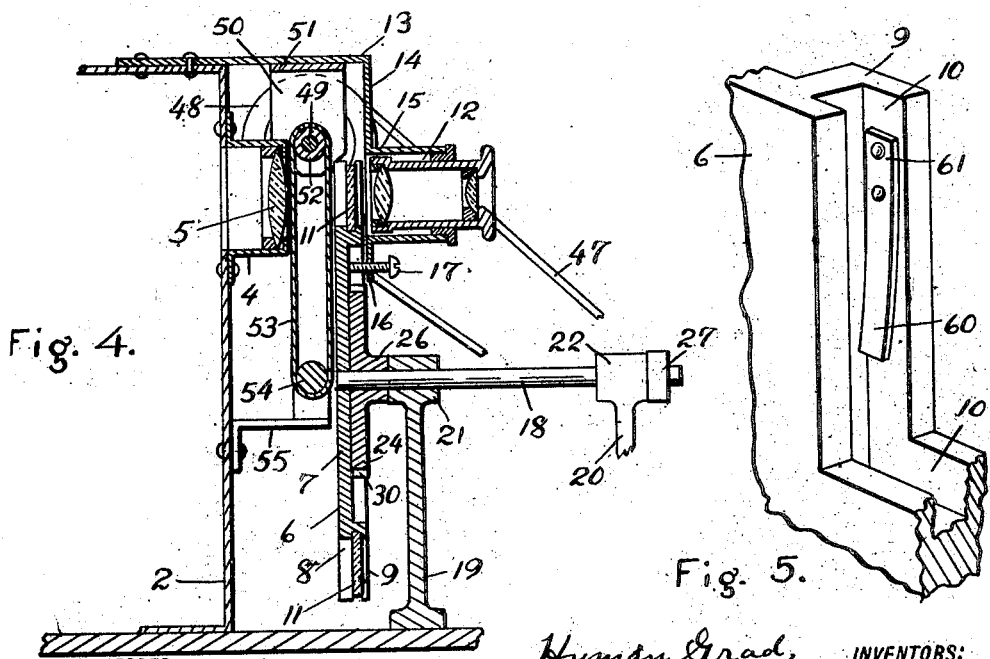

UNITED STATES PATENT OFFICE.

HYMAN GRAD, SYDNEY HERBERT KLEEBERG, AND WILLIAM HARRIS, OF NEWARK, NEW JERSEY.

ADVERTISING DISPLAY DEVICE.

1,107,293.   Specification of Letters Patent.   Patented Aug. 18, 1914.

Application filed January 30, 1913. Serial No. 745,061.

*To all whom it may concern:*

Be it known that we, HYMAN GRAD, a subject of the Emperor of Austria-Hungary, SYDNEY H. KLEEBERG, a subject of the King of Great Britain, and WILLIAM HARRIS, a citizen of the United States, all residents of Newark, in the county of Essex and State of New Jersey, have invented certain Improvements in Advertising Display Devices, of which the following is a specification.

This invention relates more particularly to that class of advertising display devices in which the advertisement is projected by means of a lantern onto a suitable screen.

The objects of the invention are to provide an automatic device of this character requiring minimum attention; to provide such a device which will display successively a plurality of advertisements; to provide an intermittent movement of the slide holder whereby the display of an advertisement may be given a definite interval of time and the change from one advertisement to the next made quickly at the completion of such interval of time; to provide means for locking the slide holder in stationary position during the interval of display of each advertisement; to introduce a changing color on the advertisements during their intervals of display; to provide a suitable housing for the device, having a screen, whereby the device may be transported from place to place and be ready for immediate use; to secure simplicity of construction and operation, and to obtain other advantages and results as may be brought out in the following description.

Figure 1:
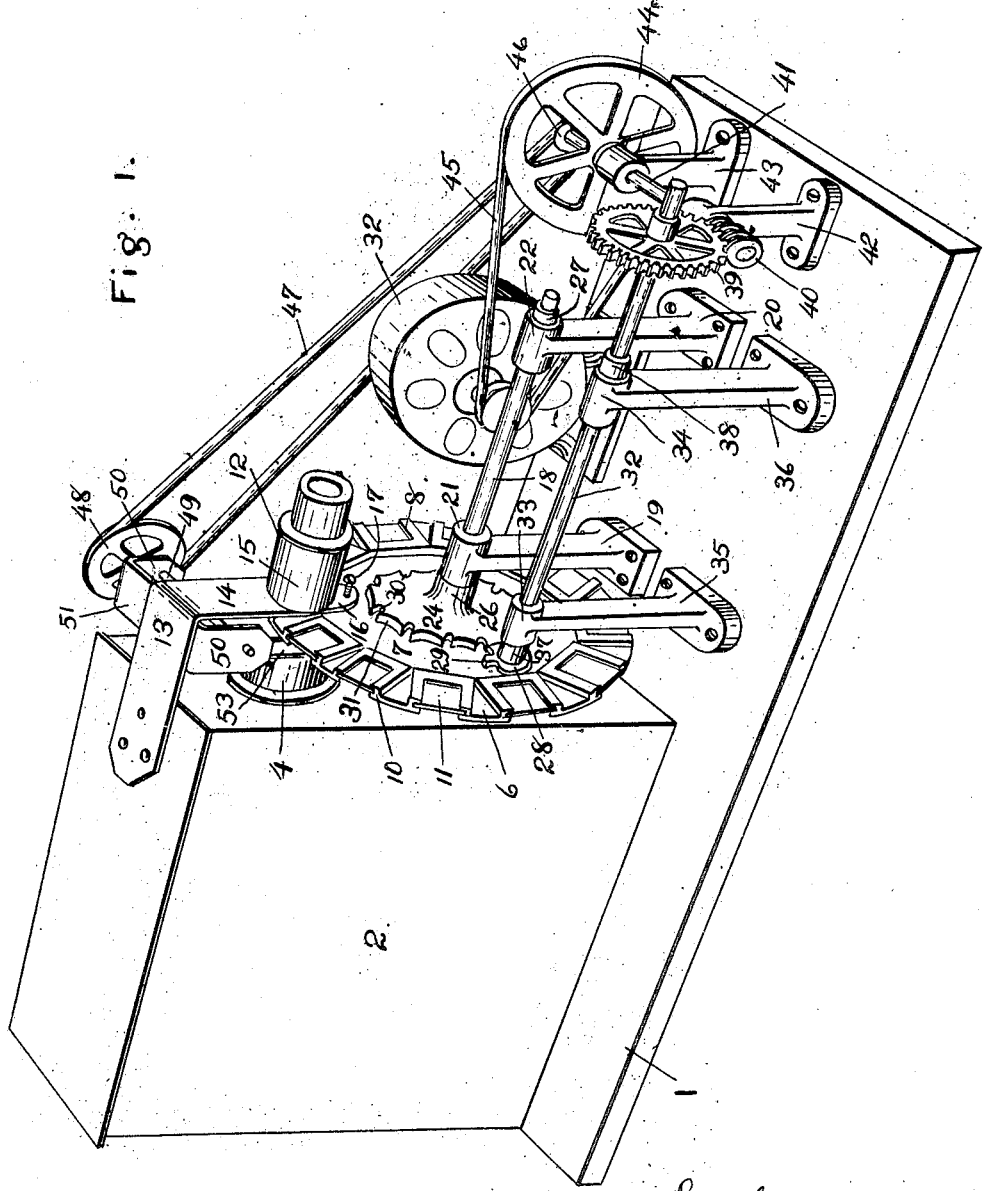
Figure 2:
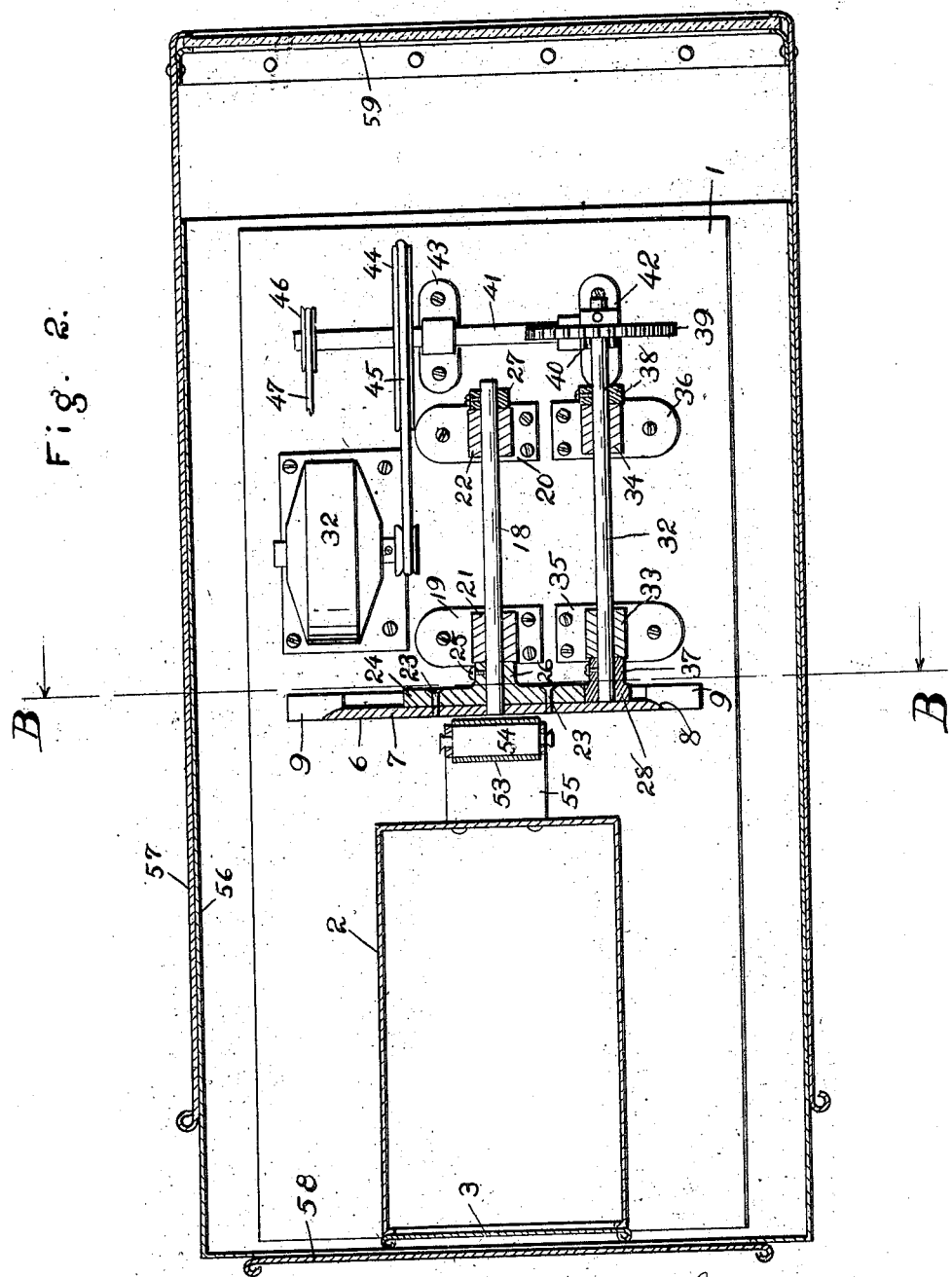

In the accompanying drawings, in which like numerals of reference indicate the same parts throughout the several views, Figure 1 is a perspective view of the advertising display device removed from its case; Fig. 2 is a horizontal section through the device with its case in position, on line A—A, Fig. 3; Fig. 3 is a vertical transverse section on line B—B, of Fig. 2, looking in the direction indicated by the arrows; Fig. 4 is a vertical longitudinal section through a portion of the device showing the slide carrier in diametric section; and Fig. 5 is a detail perspective view of a portion of the groove extending around each slide holder, showing one of the springs for frictionally retaining the slide in position.

In the specific embodiment of the invention illustrated in said drawings, the reference numeral 1 indicates a suitable base for supporting the various mechanisms and 2 is a lantern housing of any well-known type which is supported midway between the lateral edges of the base 1 at one end and adapted to contain any suitable lamp or lighting means (not shown) of well-known and approved type. As is usual, the rear end of this lantern housing 2 is provided with a door 3 for access into the interior thereof, and the front end of the lantern housing is provided with a lens holder 4 carrying a lens 5 as is customary in lantern construction. At a spaced distance in front of the lens 5 is mounted a rotary slide carrier 6, having its axis of rotation parallel to the axis of said lens in the preferred construction. This slide carrier 6 preferably comprises a disk-like body portion 7 radially recessed or slotted at its periphery as at 8, 8, and around the three edges of each of these slots on the front side of the body portion, is integrally formed or attached a U-shaped slide holder 9 grooved about its inner periphery as at 10 for the slidable introduction of a slide 11 of greater width than the slot 8 in the body portion whereby lateral displacement of the slide 11 from the groove 10 is prevented by engagement of its margin with the overlapping portions of the body portion 7 and the slide holder 9. Each of these slides 11 is preferably of a transparent material such as glass and bears the advertisement (not shown) which it is desired to project. The slots 8 about the periphery of the body portion are adapted to be brought intermittently in registration with the lens 5 of the lantern so that light projected therethrough will pass also through the slides in the slots.

Arranged in front of the position of the slides when in alinement with the lens 5 and in substantial axial alinement with the lens 5 is a telescopic focusing lens holder 12 of any suitable type well-known in the art for focusing the image onto a screen. We have shown this focusing lens holder supported by a bracket 13 extending outward from the top of the lantern box or housing 2 over the slide carrier 6 and downward as at 14 in front of the same to the stationary portion 15 of the telescoping lens holder. As means for raising or lowering the image or advertisement in its projected position upon the screen we extend the downwardly extending arm 14 of the bracket below the focusing lens holder 12, as at 16, and provide through this extension a screw 17 to bear against the lateral surface of the body portion of the slide carrier 6. Obviously by screwing the screw 17 inwardly the image will be raised on the screen and by loosening or retracting the screw will lower the projection of the image.

In order to revolve the slide carrier 6 so as to successively present the slides 11 carrying the advertisements in registration with the projecting lenses, said carrier is mounted upon a shaft 18 extending longitudinally of the base and supported in properly spaced relation thereabove by standards 19, 20 provided with suitable bearings 21, 22 at their upper ends. We provide an intermittent drive for said carrier, and for this purpose secure, as by screws 23, 23, a gear 24 to the carrier in axial coincidence therewith and also secured to the shaft 18 as by a set screw 25 through the hub 26 of said gear. It may here be noted that said hub is arranged to bear at its outer end against the adjacent end of the bearing 21 to prevent lateral movement or displacement of the carrier 6 away from the lantern and that movement toward the lantern is prevented by a collar 27 adjacent the outer end of the shaft 18 and bearing on the outer end of the other bearing 22.

A continuously revolving disk or plate 28 is mounted adjacent the gear 24 and in the same plane therewith, and provided at one circumferential point with a single projection or tooth 29 adapted at each revolution to engage in a slot 30 of the gear 24, it being understood that the gear 24 is provided about its periphery with slots 30 at spaced intervals so that engagement of the tooth 29 in one slot 30 will turn the carrier 6 until said tooth parts mesh with that slot and will place the next slot in position to receive the tooth 29 when it revolves sufficiently to enter the same. The ends of the teeth of the gear 24 between the slots 30 are cylindrically concave, as indicated at 31, the axis of curvature being coincident with the axis about which the disk 28 revolves. The disk 28 is preferably circular for the major part of its circumference, except adjacent the tooth 29 where it is recessed toward the tooth for the proper operation thereof, the radius for the circular portion being equal to the radius of curvature of the concaved ends 31 of the teeth of the gear 24 whereby as the disk revolves with its tooth out of engagement with the slots 30, the periphery of the disk is in slidable engagement with the gear 24. But as the disk 28 projects inside of the maximum circumference of the gear by virtue of the concaved teeth, the gear 24 is positively held against any rotative movement until the disk has revolved sufficiently for the tooth 29 thereof to engage one of the slots 30 and carry the gear forward another step when the disk again locks the gear against rotation.

The disk 28 is driven in a continuously rotative direction by any suitable means such as by a motor 32 connected thereto by any convenient and suitable means adapted to the purpose. As here shown, the disk 29 is nonrotatably secured upon a counter shaft 32 in its proper relation to the gear 24, which shaft is journaled in suitable bearings 33, 34 of standards 35, 36 and prevented from the longitudinal movement therein by means of the hub 37 on the disk bearing against the end of the bearing 33 toward the lantern, and a collar preventing longitudinal movement toward the lantern by being positioned on the relatively opposite side of the other bearing 34 and secured to the shaft thereat. Adjacent the end of this counter shaft 32 a worm wheel 39 is fixed thereon meshing with a worm 40 on a transverse shaft 41 carried in standards 42, 43 at the front of the base 1. This transverse shaft 41 has near its other end a pulley 44 receiving a belt 45 from the motor 32, it being understood that the proper speed of the disk may be effected by proportioning the size of the pulleys and worm drive to correspond to the normal speed of the motor.

As here shown, the end of the transverse shaft 41 away from the worm 40 is provided with a pulley 46 for driving a belt 47. This belt drives another pulley 48 adjacent the lantern housing and carried by a transverse shaft 49 supported by the depending ears 50, 50 of a bracket 51 secured to the bracket 13 carrying the telescopic lens holder 12. This shaft 49 carries a suitable drum 52 over which travels a flexible ribbon or film 53 extending substantially vertical downward between the lens 5 in the lantern and the slide carrier 5 in the path of the light from the lantern and traveling around a lower or idle drum 54 held by a suitable bracket 55. This film 53 is preferably endless and transparent to light but having various colors throughout its length so that as the drum 52 revolves the same a variation in the color of light projected with the advertisement takes place while each such advertisement is being exhibited. It will be noted that the two opposite runs of this film 53 both lie in the path of light between the lantern and slide, and that since said runs travel in different directions there is an intermixing and changing of colors, due to different portions of the film coming opposite each other, which greatly enhances the effect and could not be produced with a ribbon of the same length having only one run between the lantern and picture slide.

We preferably provide a case for the device comprising inner and outer telescopic sections 56, 57, respectively, see Figs. 2 and 3. These sections may be made of any suitable material, such as sheet metal, and one as 56 provided with a door 58 at its rear end for access to the interior, and the forward end open, while the other section 57 is provided at its front with a screen 59 such as ground glass and its back end open to receive the other section 56. The lens may therefore be focused to project the advertisement upon the inner side of the screen 59 and the device operated within said telescopic sections. With a screen 59 as above suggested, the advertisement may be read from the outside and can of course by proper manipulation of the telescopic case sections and the lenses, be made of any desired size within the limits of the screen. It is to be understood that this particular construction is especially adapted for use in show windows where it may be set and attract the attention of passers-by, but of course it is within the scope of the invention to use the same in other ways and to construct it on a larger scale if desired for bill-board advertising and the like.

Preferably the groove slide holders 9 have arranged upon the front walls of their groove 10, and in the opposite arms of the U-shaped holder, leaf springs 60, 60 secured at one end as at 61, see Fig. 5 and adapted at the other end to press against the slide to retain the same, in place. Obviously by this arrangement the slide may be small enough to move slightly edgewise in its holder and thus be adjusted to exact position under the yielding pressure of said springs.

We do not limit ourselves to the precise constructions and arrangements shown and described, since the same are given in some detail merely for the sake of clearness, and do not wish to be understood as restricting our invention except as required by the appended claims when construed in the light of the prior art. Parts of our construction may also be employed to the exclusion of other parts without departing from the spirit and scope of the invention.

Having thus described the invention, what we claim is—

1. The combination with a projecting lantern and means for introducing a slide into the path of projection, of an endless film variously colored for different portions of its length and having oppositely traveling portions of itself in the path of light between the lantern and said slide-introducing means, and means for operating said film.

2. The combination with a projecting lantern and means for introducing a slide into the path of projection, of rollers on opposite sides of said path of projection, an endless film variously colored for different portions of its length passing around said rollers and returning from each one to the other across the path of projection in substantially parallel planes, and means for driving one of said rollers.

3. The combination of a projecting lantern, a bracket extending forwardly from the top of said lantern and having a downwardly extending arm, a lens holder carried by said arm, means for introducing a slide between said lantern and lens holder, a roller supported on said bracket above the path of light, a film variously colored for different portions of its length extending over said roller with portions of itself depending between said lantern and downwardly extending arm of the bracket across the path of light, means below the path of light for guiding said film, and means for causing said color film to travel.

HYMAN GRAD.
SYDNEY HERBERT KLEEBERG.
WILLIAM HARRIS.

Witnesses:
 HOWARD P. KING,
 JANET A. AYERS.